United States Patent [19]
Cremer

[11] Patent Number: 6,028,687
[45] Date of Patent: Feb. 22, 2000

[54] ARRANGEMENT FOR RECOVERING A CLOCK FROM A MODULATED OPTICAL INPUT SIGNAL

[75] Inventor: Cornelius Cremer, Poing, Germany

[73] Assignee: Siemens Aktiengesellschaft, Munich, Germany

[21] Appl. No.: 08/894,456

[22] PCT Filed: Feb. 15, 1996

[86] PCT No.: PCT/DE96/00241

§ 371 Date: Aug. 15, 1997

§ 102(e) Date: Aug. 15, 1997

[87] PCT Pub. No.: WO96/26585

PCT Pub. Date: Aug. 29, 1996

[30] Foreign Application Priority Data

Feb. 21, 1995 [DE] Germany ............... 195 05 980

[51] Int. Cl.[7] .................................. H04B 10/00
[52] U.S. Cl. .................... 359/158; 359/160; 359/134; 372/26
[58] Field of Search .................... 359/158, 160, 359/134, 173; 372/26

[56] References Cited

U.S. PATENT DOCUMENTS 5,548,433  8/1996  Smith ............................ 359/158
5,761,228  6/1998  Yano ............................. 359/158

OTHER PUBLICATIONS

8106 IEEE Journal of Quantum Electronics 28 (1992) Apr., No. 4, New York, US Optical Tank Circuits Used for All–Optical Timing Recovery—Masahiko Jinno et al., pp. 895–900.

Patent Abstracts of Japan—JP 2126243—vol. 14 No. 352 (P–1085), May 15, 1990 (p.01/01); Japanese Patent pp. 263–269 attached.

BT Technol J vol. 11 No. 2 Apr. 1993—Nonlinear loop mirror devices and applications—K.J. Blow et al. pp. 99–107.

IEEE Photonics Technology Letters, vol. 6, No. 1, Jan. 1994—"18 GHz All–Optical Frequency Locking and Clock Recovery Using a Self–Pulsating Two–Section DFB–Laser"—U. Feiste et al—pp. 106–108.

IEEE Photonics Technology Letters, vol. 3, No. 10, Oct. 1991—All–Optical Clock Recovery from 5 Gb/s RZ Data Using a Self–Pulsating 1.56 $\mu$m Laser Diode—P.E. Barnsley et al—pp. 942–945.

Electronics Letters Sep. 10th 1992 vol. 28, No. 19—All–Optical Clock Recovery Using A Mode–Locked Laser—K. Smith et al., pp. 1814–1816.

Electronics Letters May 12th 1994, vol. 30, No. 10, "Enhanced Recovery Rates In Semiconductor Laser Amplifiers Using Optical Pumping" —R.J. Manning et al., pp. 787–788.

Electronics Letters Jan. 20th 1994, vol. 30, No. 2, 20 Gbit/s All–Optical Clock Recovery Using Semiconductor Nonlinearity, D.M. Patrick et al., pp. 151–152.

Electronics Letters Jul. 22nd 1993, vol. 29, No. 15, All Optical Clock Recovery At Bit Rates Up To 40 Gbit/s—A.D. Ellis et al—pp. 1323–1324.

Primary Examiner—Kinfe-Michael Negash
Attorney, Agent, or Firm—Hill & Simpson

[57] ABSTRACT

A laser arrangement for recovering a clock from a modulated optical input signal ($S_o$) has, between a resonator mirror (21) for launching the input signal and a resonator mirror (42) for coupling out the recovered clock (T), a bidirectional optical transmission channel (3) having at least two nonlinear optical amplifiers (2, 4) and a demultiplexer (6) between the amplifiers. The arrangement is operated as a mode-locked laser and is suitable for optical repeaters.

13 Claims, 1 Drawing Sheet

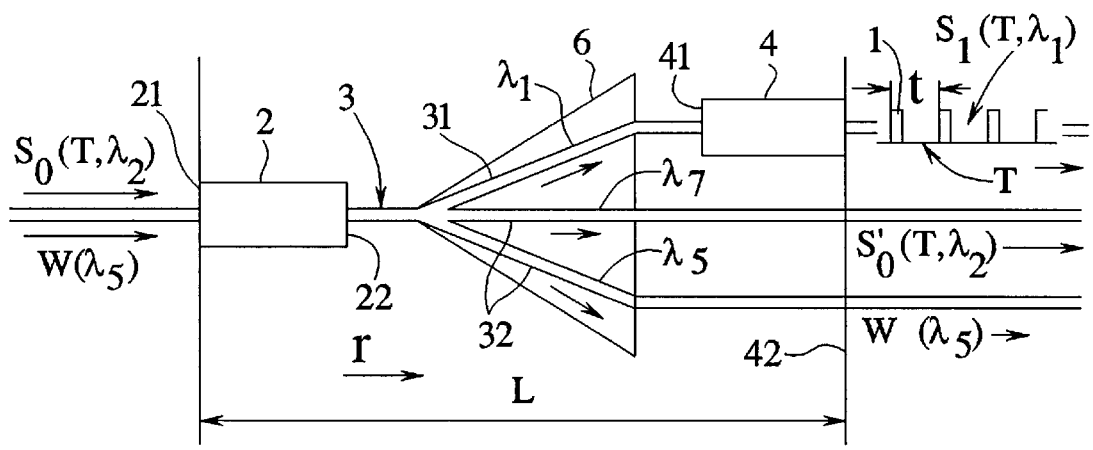
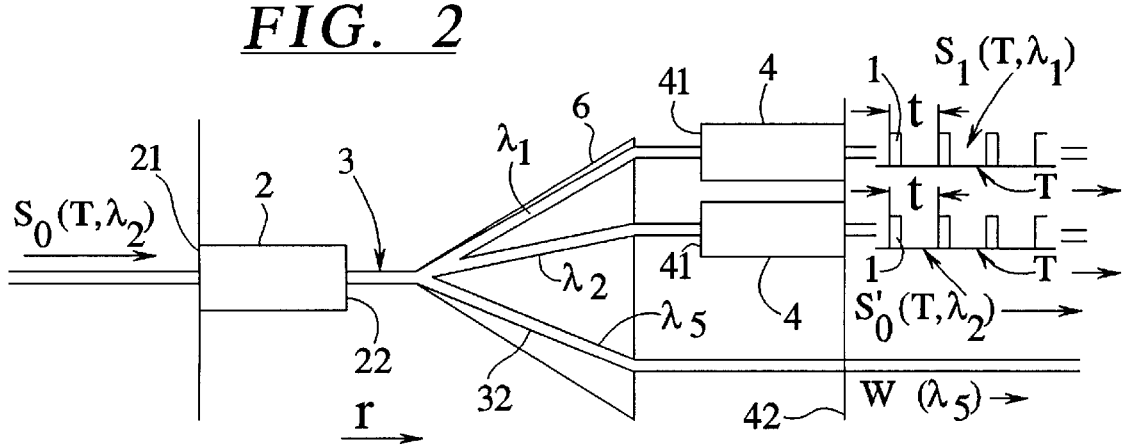
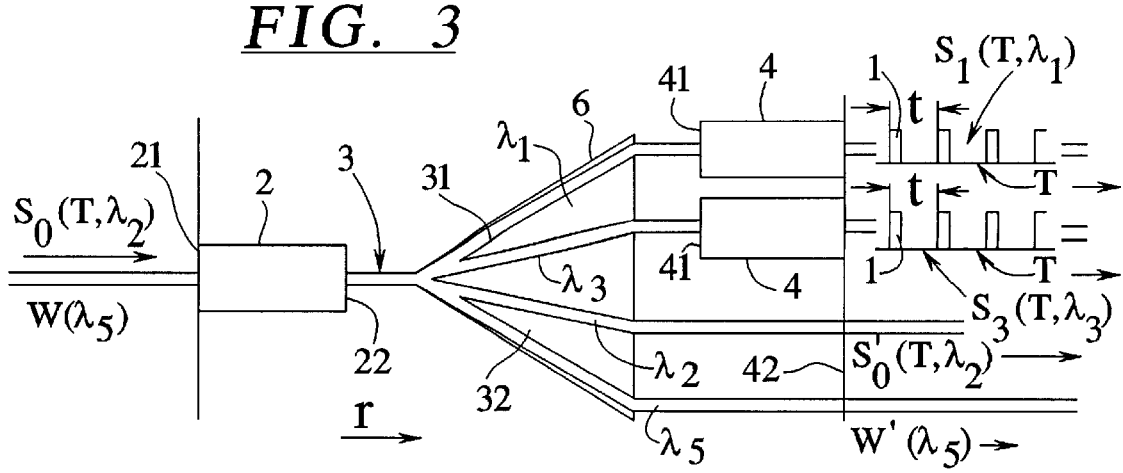

ARRANGEMENT FOR RECOVERING A CLOCK FROM A MODULATED OPTICAL INPUT SIGNAL

Modulated optical input signal clocked by this clock on an optical input carrier wavelength are disclosed, for example, in D. M. Patrick, R. J. Manning: 20 Gbit/s all-optical clock recovering using semiconductor nonlinearity, Electr. Lett. Vol. 30 (1994), pages 151 to 152; A. D. Ellis, K. Smith, D. M. Patrick: Alloptical clock recovery at bit rates up to 40 Gbit/s, Electr. Lett. Vol. 29 (1993), pages 1323 to 1324 or P. E. Barnsley, E. J. Wickes, E. G. Wickens, D. M. Spirit: All-optical clock recovery from 5 Gb/s RZ Data using a self-pulsating 1.56 μm Laser diode, IEEE Phot. Tech. Lett., Vol. 3 (1991) pages 942 to 945, the clock being recovered in these arrangements by mode locking of a laser to the modulated input signal. A nonlinear optical element is always required for the purpose of mode locking in an optical resonator. Use is made, as nonlinear optical elements, of optical amplifiers (see Electr. Lett. Vol. 30 (1994), pages 151 to 152), optical fibers (see Electr. Lett. Vol. 29 (1993), pages 1323 to 1324), saturable absorbers (see IEEE Phot. Tech. Lett., Vol. 3 (1991), pages 942 to 945) and sections of multisection DFB lasers (see U. Feiste, D. J. As, A. Erhardt: 18 GHz all-optical frequency locking and clock recovery using a self-pulsating two-section DFB laser, IEEE Phot. Tech. Lett. Vol. 6 (1994), pages 106 to 108 or R. J. Manning, D. A. O. Davies, D. Cotter, J. K. Lucek: Enhanced recovery rates in semiconductor laser amplifiers using optical pumping, Electr. Lett. Vol. 30 (1994), pages 787 to 788).

The data rate of saturable absorbers has so far been limited to approximately 5 Gb/s (see IEEE Phot. Tech. Lett., Vol. 3 (1991), pages 942 to 945).

Data rates of 40 Gb/s have already been achieved using optical fibers. However, with fiber lengths of approximately 10 km, they are difficult to integrate.

20 Gb/s (see Electr. Lett. Vol. 30 (1994), pages 151 to 152) have been achieved using optical amplifiers in the resonator, and a figure of 18 GHz (see IEEE Phot. Tech. Lett. Vol. 6 (1994), pages 106 to 108) has been achieved using multisection DFB lasers.

An advantage of an arrangement having an optical amplifier in the resonator as compared with multisection DFB lasers is that the nonlinear element is more effectively separated from the residual resonator with its amplifying medium, and can therefore be specifically influenced. Thus, a proposal has already been made as to how the clock can be brought up to 100 Gb/s using an optical amplifier in the resonator, specifically by intensive pumping of the nonlinearly operating optical amplifier using a continuously operating laser (see Electr. Lett. Vol. 30 (1994), pages 787 to 788).

SUMMARY OF THE INVENTION

The invention, whose generic concept specified in the preamble is disclosed in Electr. Lett. Vol. 30 (1994), pages 151 to 152, or else Electr. Lett. Vol. 30 (1994), pages 787 to 788, has the advantage that the laser arrangement can be integrated in a module and that it is rendered possible to recover the clock from the modulated input signal in optical networks with high data rates of 10 Gb/s and more.

The arrangement according to the invention, which can be designated as an optical clock, corresponds to a mode-locked laser which has an optical resonator with a wavelength-selective optical transmission channel section and at least one optical amplifier at each end of this channel section, the position of the wavelength-selective optical transmission channel section in the resonator being essential to the invention.

The optical transmission channel section can advantageously be realized by a bidirectional optical wavelength demultiplexer which acts as a demultiplexer when operated in one direction and acts as a multiplexer when operated in the opposite direction.

The arrangement according to the invention can advantageously be used to regenerate the optical input signal in an optical repeater.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a first exemplary embodiment of an arrangement according to the invention, FIG. 2 shows a second exemplary embodiment of an arrangement according to the invention, and FIG. 3 shows a third exemplary embodiment of an arrangement according to the invention.

DESCRIPTION OF THE PREFERRED EMBODIMENTS

The laser arrangement according to the invention and represented by way of example in FIGS. 1 to 3 recovers the clock T from a modulated optical input signal $S_o$ clocked by this clock T on an input carrier wavelength $\lambda_2$, and has an optical resonator 1 composed of a bidirectional optical transmission channel 3 of predetermined optical length L and extending between two resonantor mirrors 21 and 42.

The transmission channel 3 has, between the two resonator mirrors 21 and 42, at least two nonlinear optical amplifiers, for example the two amplifiers 2, 4 according to FIG. 1 and, between these amplifiers 2, 4, a wavelength-selective transmission channel section 31.

The two amplifiers 2, 4 are arranged sequentially in a transmission direction r of the transmission channel 3 pointing from one resonator mirror, for example the resonator mirror 21, to the other resonator mirror, to the resonator mirror 42 in the case of the example.

The transmission channel section 31 connects the two amplifiers 2, 4 optically and serves to transmit an optical signal on a predetermined optical carrier wavelength between these two amplifiers 2, 4, for example the signal $S_1'$ on the predetermined carrier wavelength $\lambda_1$ in FIG. 1.

On the basis of the transmission direction r specified above—the opposite direction could also be adopted—the input signal $S_o$ on the input carrier wavelength $\lambda_2$ is launched into the transmission channel 3 by the resonator mirror 21. The other resonator mirror 42 serves to couple out an optical signal $S_1$ on the predetermined carrier wavelength which originates from the second and last amplifier 4 in the adopted transmission direction r.

Together with the first amplifier 2, the last amplifier 4 and the wavelength-selective transmission channel section 31, the resonator 1 forms a mode-locked laser if the first amplifier 2 operates in the nonlinear region with respect to the launched input signal $S_o$. For this purpose, the light power, for example, of the input signal $S_o$ is selected to be so high that the first amplifier 2 operates in the nonlinear region, that is to say the optical signal power is higher than the saturation power of the first amplifier 2. A gain then occurs in the resonator 1 which is modulated for all optical wavelengths with the signal rate of the input signal $S_o$, and the longitudinal laser modes of the laser arrangement are coupled to one another, with the result that pulses with the clock rate of the input signal $S_o$ occur. The pulse width of the mode-locked laser is a function of the modulation of the input signal $S_o$, of the bit sequence and of the bandwidth of the wavelength-selective transmission channel section 31.

The optical signal $S_1$ originating from the last amplifier 42 and coupled out by the other resonator mirror 42 has pulses I which occur inherently periodically in a clock cycle t of the clock T and define the covered clock T.

In order to adapt the propagation time of the pulses through the resonator 1 to the clock cycle t of the clock T of the input signal $S_o$ in such a way that it is an integral multiple of this clock cycle t, the optical length L of the transmission channel 3 of the resonator 1 can be adapted, for example, by trimming the temperature of an optical amplifier 2 and/or 4.

There is only one last optical amplifier 4 in addition to the first amplifier 2 in the example according to FIG. 1.

However, in the example according to FIG. 1, the transmission channel 3 has an additional wavelength-selective transmission channel section 32 which is arranged between the first amplifier 2 and the other resonator mirror 42 and connects the first amplifier 2 optically directly to the other resonator mirror 42. This additional transmission channel section 32 is designed in such a way that the other resonator mirror 42 is fed an optical signal $S_o'$ on the intput carrier wavelength, which signal originates from the first amplifier 2 $\lambda_2$, can be coupled out of the other resonator mirror 42 and is inherently clocked by the clock T and is modulated in accordance with the input signal $S_o$ such that it corresponds to the launch signal $S_o$.

In the example according to FIG. 1, the arrangement could also be set up, for example, such that the transmission channel section 31 connected to the last amplifier 4 transmits only the input carrier wavelength $\lambda_2$, and the additional transmission channel section 32 connected to the other resonator mirror 42 transmits only the carrier wavelength $\lambda_1$. In this case, which is not represented in FIG. 1, it would be possible to couple out of the resonator mirror 42, on the one hand, an optical signal $S_2$, originating from the first amplifier 2 and transmitted via the transmission channel section 31, on the input carrier wavelength $\lambda_2$ and, on the other hand, an optical signal $S_1$, originating from the first amplifier 2 and transmitted via the additional transmission channel section 32, on the carrier wavelength $\lambda_1$. The signal $S_2$ on the input carrier wavelength $\lambda_2$ would have pulses I which occur inherently periodically in the clock cycle t of the clock T and define the recovered clock T, and the signal $S_1$ on the carrier wavelength $\lambda_1$ would be a signal clocked inherently by the clock T and modulated in accordance with the input signal $S_o$. This signal $S_1$ would correspond to the signal $S_o'$ or the input signal $S_o$ which is converted from the input carrier wavelength $\lambda_2$ to the carrier wavelength $\lambda_1$.

A wavelength conversion is generally possible in the case where signals on different carrier wavelengths are coupled out of the other resonator mirror 42.

A wavelength conversion of the input signal $S_o$ can also be performed by modulating in accordance with the input signal $S_o$ an optical signal on a carrier wavelength which originates from a last amplifier 4, is coupled out of the resonator mirror 42 and has pulses which occur inherently periodically in the clock cycle of the clock and define the recovered clock T, for example the signal $S_1$ on the carrier wavelength $\lambda_1$ according to FIG. 1. This modulated signal would correspond to the input signal $S_o$ which has been converted to this carrier wavelength from the input carrier wavelength $\lambda_2$.

The exemplary embodiment according to FIG. 2 differs from the exemplary embodiment according to FIG. 1 essentially in that, between the two resonator mirrors 21 and 42, the transmission channel 3 has, in addition to the first nonlinear optical amplifier 2, two last nonlinear optical amplifiers 4, which are arranged downstream of the first amplifier 2 in the transmission direction r, as well as a wavelength-selective transmission channel section 31 which is arranged between the first amplifier 2 and the two last amplifiers 4, connects the first amplifier 2 optically to each last amplifier 4 and is designed in such a way that one optical signal $S_1$, $S_2$ each is transmitted between the first amplifier 2 and each last amplifier on a predetermined carrier wavelength $\lambda_1$ and $\lambda_2$, respectively, assigned to this last amplifier 4, it being the case that the other resonator mirror 42 serves to couple out of the transmission channel 3 on the predetermined carrier wavelength $\lambda_1$ and $\lambda_2$, respectively, assigned to this last amplifier 4 the optical signal $S_1$, $S_2$ which originates from each last amplifier 4 and which has pulses I which occur inherently periodically in the clock cycle t of the clock T and define the recovered clock T.

Specifically, in FIG. 2 the carrier wavelength $\lambda_1$ is assigned to the upper last amplifier 4, and the input carrier wavelength $\lambda_2$ is assigned to the lower last amplifier 4. In this specific case, the recovered clock T can be connected between the carrier wavelengths $\lambda_1$ and $\lambda_2$.

Two or more such last optical amplifiers 4 generally provide the possibility of switching the carrier wavelength of the recovered clock T on a predetermined raster.

Wavelength conversion would also be possible in the case of the example according to FIG. 2 if the output signal $S_1$ were modulated in accordance with the input signal $S_o$.

The exemplary embodiment according to FIG. 3 differs from the exemplary embodiment according to FIG. 2 essentially in that the lower last amplifier 4 is assigned not the input carrier wavelength $\lambda_2$, but a carrier wavelength $\lambda_3$ which differs both therefrom and from the carrier wavelength $\lambda_1$ assigned to the upper last amplifier 4, and in that, as in the example according to FIG. 1, the transmission channel 3 has an additional wavelength-selective transmission channel section 32 which is arranged between the first amplifier 2 and the other resonator mirror 42 and connects the first amplifier 2 optically directly to the other resonator mirror 42. This additional transmission channel section 32 is designed in such a way that the other resonator mirror 42 is fed on the input carrier wavelength $\lambda_2$ an optical signal $S_o'$ which originates from the first amplifier 2, can be coupled out of the other resonator mirror 42 and is inherently clocked by the clock T and is modulated in accordance with the input signal $S_o$ such that it corresponds to the launch signal $S_o$.

It is possible to couple out of the resonator mirror 42 on the carrier wavelength $\lambda_3$ assigned to the lower last amplifier 4 an optical signal $S_3$ which originates from this lower last amplifier 4 and has impulses I which occur inherently in the clock cycle t of the clock T and define the recovered clock T. In this specific case, the recovered clock T can be connected between the carrier wavelength $\lambda_1$ and $\lambda_3$. Here, as well, wavelength conversion is possible if at least one of the two signals $S_1$ and $S_3$ is modulated in accordance with the input signal $S_o$.

In order to be able to drive the clock rate of the clock T recovered from the optical clock as high as possible, the nonlinearly operating first optical amplifier 2 must be illuminated by an intensive undamped optical wave W of a further optical wavelength $\lambda_5$ which differs both from the input carrier wavelength $\lambda_2$ and from the carrier wavelengths $\lambda_1$, $\lambda_3$ which differ from this wavelength $\lambda_2$ (see Electr. Lett. Vol. 30 (1994) pages 787 to 788). This further optical wavelength $\lambda_5$ either can be launched into the resonator 1 via an existing additional optical transmission channel section 32, and then radiates against the launched input signal $S_o$, or is mixed with the input signal $S_o$ and then separated from the launched signal and emitted at another point.

In the examples according to FIG. 1 and FIG. 3, the set-up is such that the undamped wave W is launched into the first amplifier 2 by one resonator mirror 21. Coupled out of the first amplifier 2 is an optical wave W' which corresponds to the launched wave W, has the same optical wavelength $\lambda_5$ as the latter, is fed to the other resonator mirror 42 via the additional transmission channel section 32 and can be coupled out of this resonator mirror 42. The additional transmission channel section 32 according to FIG. 1 and FIG. 3 is designed for this reason in such a way that, in addition to the input carrier wavelength $\lambda_2$, it also transmits the wavelength $\lambda_5$ of the optical wave W.

In the example according to FIG. 2, by contrast, the undamped wave W is launched into the first amplifier 2 by the other resonator mirror 42 via the additional transmission channel section 32.

The transmission channel section 31 and/or additional transmission channel section 32 are/is preferably realized by a bidirectional optical wavelength demultiplexer 6, an integratable demultiplexer being preferred.

A method which can be used to integrate a demultiplexer with active optoelectronic elements is specified in the published European Patent Application 0 497 358.

One resonator mirror 21 of the resonator 1 is preferably a partially reflecting amplifier input of the first optical amplifier 2. The other resonator mirror 42 of the resonator 1 is preferably a partially reflecting mirror which comprises a partially reflecting optical amplifier output of one or more last amplifiers 4.

One amplifier output 22 of the first optical amplifier 2 and the amplifier input 41 of each last optical amplifier 4, to which the transmission channel section 31 is optically coupled, are preferably optically coated.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A laser arrangement for recovering a clock from a modulated optical input signal, the input signal being clocked by said clock on an optical input carrier wavelength, comprising:

an optical resonator having a bidirectional optical transmission channel that has a predetermined optical length and that extends between two resonator mirrors;

at least first and second nonlinear optical amplifiers arranged in the transmission channel between the resonator mirrors;

an input signal that is coupled into the transmission channel by a first mirror of the two resonator mirrors, the input signal being amplified optically in the first nonlinear optical amplifier;

an optical signal representative of a recovered clock, the optical signal being coupled out of the transmission channel by a second mirror of the two resonator mirrors;

the at least first and second nonlinear optical amplifiers arranged sequentially in a transmission direction of the transmission channel;

a wavelength-selective transmission channel section located between the at least first and second nonlinear optical amplifiers and, connecting the amplifiers;

an optical signal on a predetermined optical carrier wavelength being transmitted in the channel section;

the first resonator mirror inserting the input signal into the transmission channel on the input carrier wavelength;

the first amplifier in the transmission direction operating in a nonlinear region with respect to the input signal; and the second resonator mirror coupling out of the transmission channel the optical signal coupling out of the transmission channel the optical signal on the carrier wavelength that is determined by the transmission channel section, the optical signal originating from a last amplifier of the at least first and second amplifiers in the transmission direction and having pulses which occur periodically in a clock cycle of the clock and define a recovered clock.

2. The arrangement as claimed in claim 1, wherein, between the two resonator mirrors, the transmission channel has a first nonlinear optical amplifier and at least two last nonlinear optical amplifiers, which are arranged downstream of the first amplifier in the transmission direction, as well as a wavelength-selection transmission channel section which is arranged between the first amplifier and the at least two last amplifiers, the channel section connecting the first amplifier optically to each last amplifier and being structured such that a respective optical signal is transmitted between the first amplifier and each last amplifier on a predetermined carrier wavelength assigned to each last amplifier;

the second resonator mirror coupling out of the transmission channel on the predetermined carrier wavelength assigned to each last amplifier a respective further optical signal which originates from each last amplifier and which has pulses which occur inherently periodically in a clock cycle of the clock and define the recovered clock.

3. The arrangement as claimed in claim 2, wherein predetermined carrier wavelengths assigned to different last amplifiers differ from one another.

4. The arrangement as claimed in claim 1, wherein each predetermined carrier wavelength respectively assigned to a last amplifier differs from the input carrier wavelength.

5. The arrangement as claimed in claim 1, wherein a predetermined carrier wavelength assigned to a last amplifier is equal to the input carrier wavelength.

6. The arrangement as claimed in claim 1, wherein the optical signal, coupled out of the second resonator mirror and originating from a last amplifier, is modulated on the predetermined carrier wavelength assigned to this last amplifier.

7. The arrangement as claimed in claim 1, wherein the transmission channel has an additional wavelength-selective transmission channel section which is arranged between the first amplifier and the second resonator mirror, which connects the first amplifier optically directly to the second resonator mirror and which is structured such that there are transmitted between the first amplifier and the second resonator mirror at least two optical signals which have mutually differing predetermined optical wavelengths and can be coupled out of the second resonator mirror, the at least two optical signals being spatially separated from one another.

8. The arrangement as claimed in claim 7, wherein, via the additional transmission channel section, the second resonator mirror is fed a respective further optical signal on the input carrier wavelength, the respective further optical signal originating from the first amplifier, being coupled out of the second resonator mirror and being clocked by the clock and modulated in accordance with the input signal.

9. The arrangement as claimed in claim 1, wherein, in addition to the input signal an undamped optical wave is supplied to the first amplifier, and wherein the undamped optical wave has a further optical wavelength, which differs both from the input carrier wavelength and from the predetermined carrier wavelengths.

10. The arrangement as claimed in claim 9, wherein the undamped wave is coupled into the first amplifier by the first resonator mirror.

11. The arrangement as claimed in claim 9, wherein a further undamped optical signal is coupled out of the first amplifier, and wherein the optical further undamped signal, which relates to the undamped optical signal supplied to the first amplifier, and which has the same optical wavelength as the optical wavelength of the undamped signal supplied to the first amplifier, is fed to the second resonator mirror via the additional transmission channel section and coupled out of the second resonator mirror.

12. The arrangement as claimed in claim 9, wherein the undamped optical signal is supplied to the first amplifier by the second resonator mirror via the additional transmission channel section.

13. The arrangement as claimed in claim 1, wherein the transmission channel section is realized by a bidirectional optical wavelength demultiplexer.

* * * * *